Patented Sept. 15, 1936

2,054,683

UNITED STATES PATENT OFFICE 2,054,683

CONTROL SYSTEM

Harold S. Ogden, Erie, Pa., assignor to General Electric Company, a corporation of New York Application February 18, 1936, Serial No. 64,476

10 Claims. (Cl. 172—179)

My invention relates to control systems for multiple unit vehicles, more particularly to control systems having metering means for indicating at a plurality of points on the vehicle, the current flowing in the various motor circuits and has for an object the provision of an improved metering system of this character.

Multiple unit vehicles having a plurality of separate motor circuits associated with various units of the vehicle and a plurality of master control stations, each of which is arranged to control all of the motor circuits have heretofore been provided with control systems including metering means for indicating at each master control station the current flowing in the various motor circuits. In such previous system, however, each control station is provided with a group of meters, one meter in each group being connected to each of the motor circuits so that the number of meters in each group is equal to the number of motor circuits. Obviously, the number of meters required in such a system becomes excessive as the number of motor circuits increases and as the number of master control stations increases. Much is yet to be desired in the simplification of metering systems, of this type and accordingly it is a further object of my invention to provide a control system for a multiple unit vehicle in which each control station is provided with a meter arranged selectively to be connected to any one of the motor circuits of the vehicle.

In carrying out my invention in one form, I provide in connection with a multiple unit vehicle having a plurality of motor circuits and a plurality of master controllers, a metering system including metering means associated with each of the master controllers, and means associated with each controller for selectively connecting the associated metering means to any one of the motor circuits. More specifically, I provide a meter adjacent each controller and current deriving means, such, for example, as a current transformer, associated with each motor circuit. A plurality of transfer switches are also provided for normally connecting the respective meters to certain of the current transformers and train wires extending between the vehicle units are arranged selectively to be connected by the transfer switches to a selected one of the meters and to certain ones of the current transformers so that an indication of the current flowing in any one of the motor circuits may be selectively obtained on the selected meter.

Figure 1:
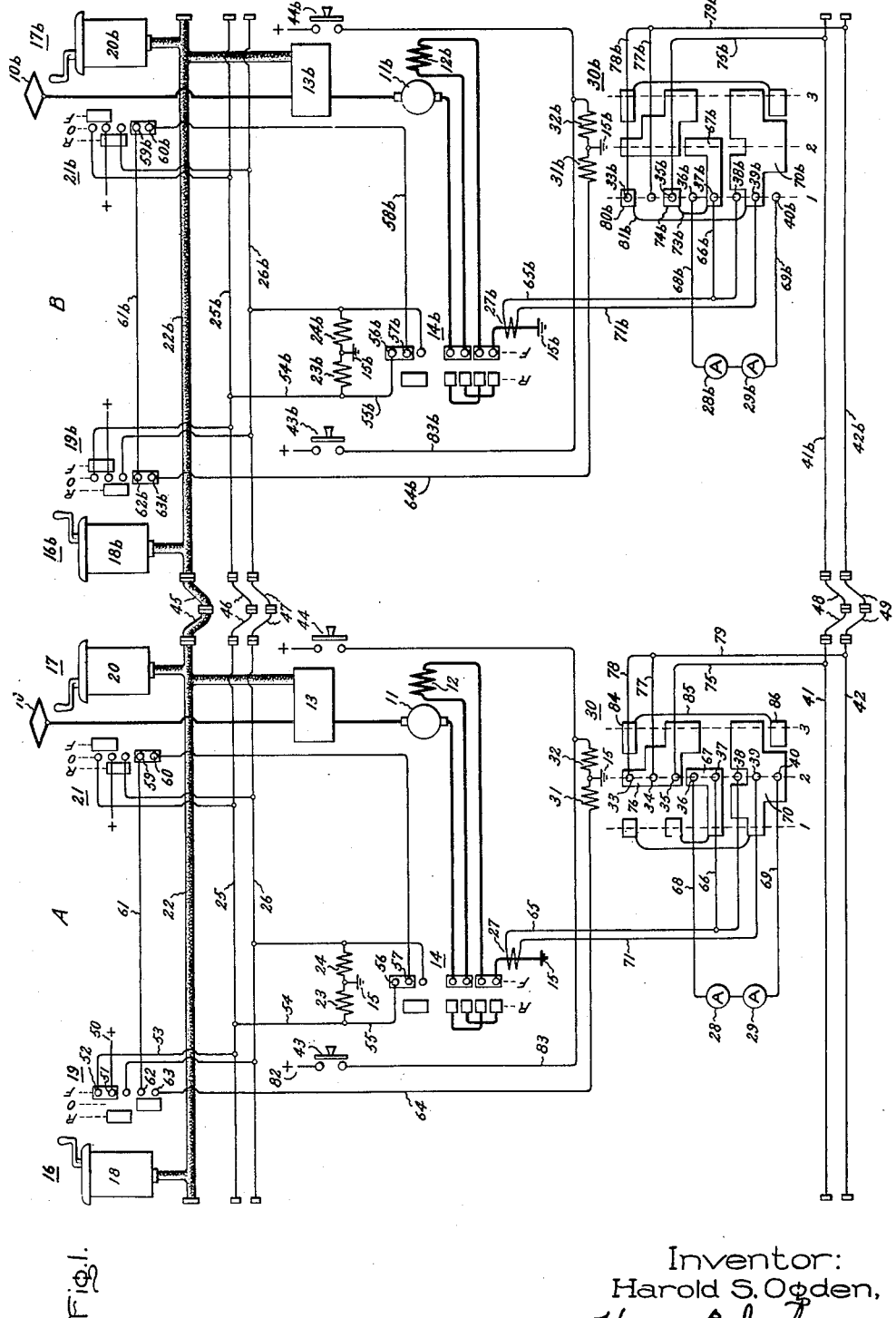
Figure 2:
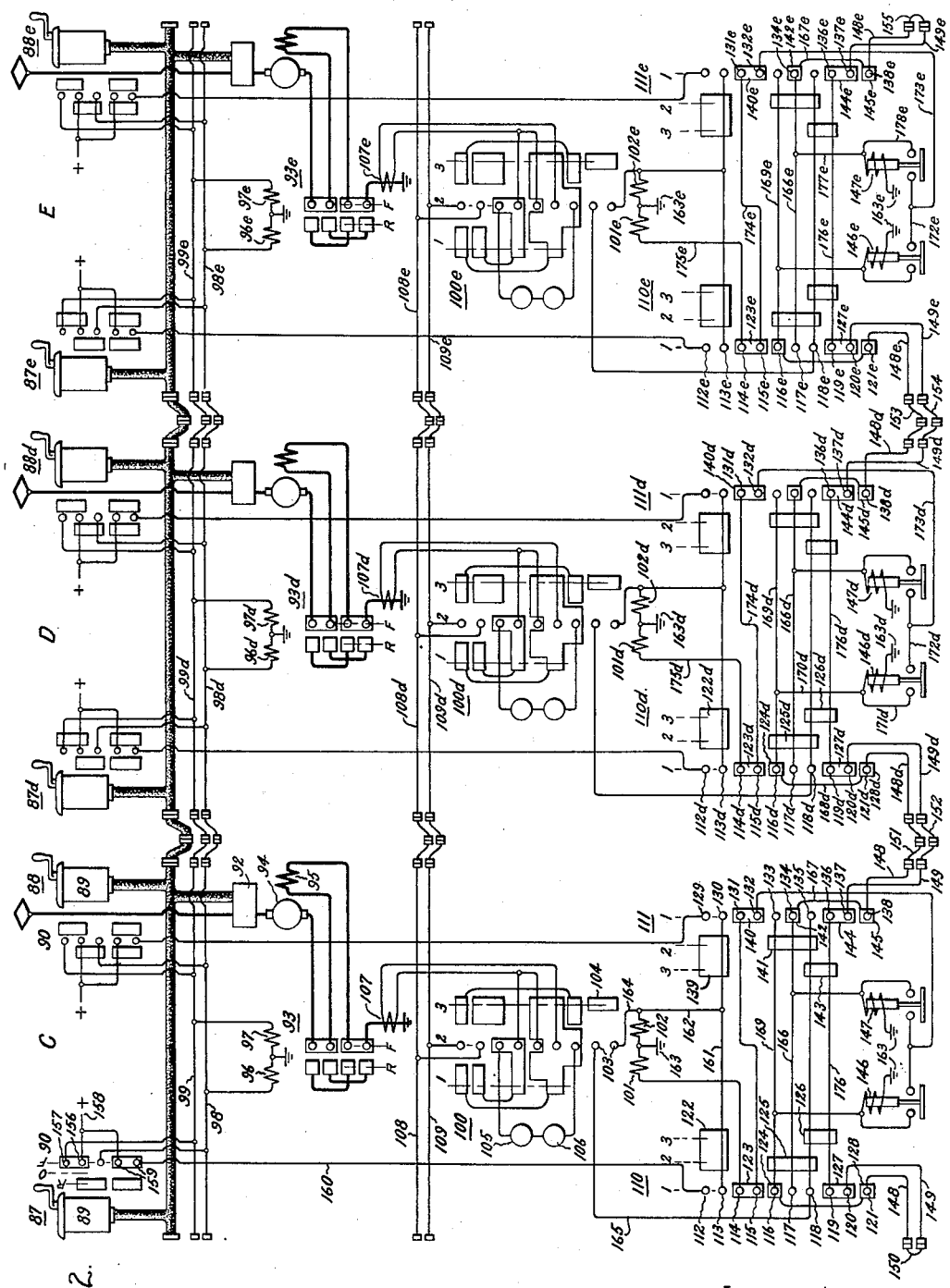

For a more complete understanding of my invention, reference may now be had to the drawings, in which Fig. 1 is a diagrammatic representation of a control system embodying my invention, and Fig. 2 is a similar representation of a modified form of control system embodying my invention.

Referring now to Fig. 1 of the drawings, I have shown my invention in one form as applied to a multiple unit vehicle comprising a pair of vehicle units A and B, respectively, which are identical in construction and arrangement. It is believed that a comprehensive understanding of my invention may best be had from a description of the operation of the vehicle and accordingly, certain parts only of the unit A will first be described in detail and in the subsequent description of the operation, similar reference numerals followed by the letter b will be used to refer to similar parts of the unit B.

As shown, the vehicle unit A is provided with a pantograph, or current collector, 10 for supplying energy from a suitable trolley or conductor (not shown) to a traction motor comprising an armature 11 and a field winding 12 through a control box 13 and a reversing switch 14, the other side of the motor circuit being provided with a suitable ground connection 15. As shown, the vehicle unit A is a double ended unit arranged for operation in either direction and is provided at its opposite ends with master control stations 16 and 17, repectively. The master control station 16 includes an acceleration controller 18 and a reversing drum 19, while the master control station 17 includes a similar acceleration controller 20 and a reversing drum 21. Although the acceleration controllers and the reversing drums are shown as separate units more clearly to illustrate the circuit connections through the reversing drums, it will, of course, be understood that these controllers are preferably constructed as one unit, the reversing drums being provided with separate reversing handles in a manner well understood by those skilled in the art.

It will be understood, of course, that the control box 13 may contain any suitable type of acceleration controlling means and, as shown, the acceleration controllers 18 and 20 are connected to the control box 13 in multiple circuit relation by suitable control cables 22 so that either the acceleration controller 18 or the acceleration controller 20 is effective to control the mechanism contained in the control box 13. The reversing switch 14, which is indicated somewhat diagrammatically, may be of any suitable type well known in the art and is shown as including a pair of operating windings 23 and 24 connected through suitable train wires 25 and 26 to the reversing drums 19 and 21, the reversing drums being connected in parallel circuit relation, so that either of the reversing drums is effective to control the energization of the windings 23 and 24.

Associated with the motor circuit of the vehicle unit A is a current transformer 27 and a plurality of meters 28 and 29 are provided, the meter 28 being positioned adjacent the master control station 16 and the meter 29 being positioned adjacent the master control station 17. Arranged selectively to control the circuit connections of the current transformer 27 to the meters 28 and 29, I provide a transfer switch 30 which is shown somewhat diagrammatically as a drum-type, three-position switch which is normally biased to the No. 2, or middle position, and which is provided with a pair of operating windings 31 and 32 which are selectively energizable to operate the transfer switch from the No. 2 position to its No. 1 position, or its No. 3 position, respectively. It will be understood, of course, that any suitable type of three-position switch may be employed, examples of which are well known in the art.

As shown, the transfer switch 30 is provided with a plurality of contact fingers 33 to 40, inclusive, the fingers 33, 34, and 35 being connected to a pair of train wires 41 and 42, the contact fingers 36 and 40 being connected through suitable conductors to the meters 28 and 29 and the contact fingers 37, 38, and 39 being connected through suitable conductors to the current transformer 27. In order selectively to control the energization of the operating winding 32, I provide a control switch 43 associated with the master control station 16 and a similar control switch 44 associated with the master control station 17.

As heretofore stated, the vehicle unit B is identical in construction with the vehicle unit A and in order to provide for multiple unit operation of the two vehicles, suitable jumpers 45 are provided for connecting the control cable 22 to the control cable 22b. Similarly, I provide suitable jumpers 46 to 49, inclusive, for connecting the train wires 25, 26, 41, and 42 to the train wires 25b, 26b, 41b, and 42b, respectively.

In describing the operation of the multiple unit vehicle, it will be assumed that the vehicle unit A is the leading unit and that it is desired to operate the vehicle in a left-hand direction, as viewed in the drawings. The control apparatus for the two vehicles is shown in the position assumed as soon as the reversing handle of the reversing drum 19 has been operated to the forward position. Upon operation of the reversing drum 19 to this position, it will be seen that an energizing circuit is established for the reversing switch 14 which may be traced from the positive source of control potential 50 through the contact fingers 51 and 52 on the reversing drum 19, the conductor 53, the train wire 25, and by way of the conductor 54, and the operating winding 23 of the reversing switch 14 to the ground connection 15, the reversing switch 14 thereupon being operated to the position shown. Likewise, an energizing circuit is completed for the reversing switch 14b, which circuit extends through the train wire 25, the jumper 46, the train wire 25b, and by way of the conductor 54b and the operating winding 23b, to the ground connection 15b. Thus, it will be seen that the field and armature circuits on the two units are connected through the reversing switches for operation in a forward direction.

Simultaneously, with the establishment of the above described circuits, an energizing circuit is established for energizing the winding 31b to operate the transfer switch 30b to the No. 1 position shown in the drawings. This circuit may be traced from the positive source of energy 50 through the contact fingers 51 and 52 on the reversing drum 19, the conductor 53, the train wire 25, the jumper 46, the train wire 25b, the conductor 54b, the conductor 55b, the auxiliary contacts 56b and 57b on the reversing switch 14b, the conductor 58b, the auxiliary contacts 59b and 60b on the reversing drum 21b, the conductor 61b, the auxiliary contacts 62b and 63b on the reversing drum 19b, and by way of the conductor 64b and the energizing winding 31b to the ground connection 15b. It will be apparent that since the auxiliary contacts on the various reversing drums are bridged only when the reversing drums are in the off position, a similar energizing circuit for the operating winding 31 of the transfer switch 30 is interrupted at the contacts 62 and 63 of the reversing drum 19.

The vehicle is now in condition for operation in a forward direction in accordance with the operation of the acceleration controller 18 on the vehicle unit A and it will be apparent that the meter 28 associated with the master control station 16 is connected through the transfer switch 30 to the current transformer 27 so as to give an indication at the master control station 16 of the current flowing through the motor circuit on the vehicle unit A. This meter circuit may be traced from one side of the current transformer 27 through the conductors 65 and 66, the contact fingers 36 and 37 bridged by the conducting segment 67, the conductor 68, the meters 28 and 29, the conductor 69, the contact fingers 40 and 39 bridged by the conducting segment 70 and by way of the conductor 71 to the other side of the current transformer 27. Similarly, it will be seen that the current transformer 27b is connected by the transfer switch 30b to the train wires 41b and 42b which are in turn connected to the train wires 41 and 42 through the jumpers 48 and 49, respectively, the train wires 41 and 42 being short-circuited through the contacts 33, 34, and 35 of the transfer switch 30. This circuit for the current transformer 27b may be traced from one terminal of the current transformer through the conductors 65b and 66b, the contact fingers 37b, the segment 67b, the conductor 73b, the conducting segment 74b, the contact finger 35b, the conductor 75b, the train wire 41b, the jumper 48, the train wire 41, the conductor 75, the contact fingers 35, 34, and 33, bridged by the conducting segment 76, the conductors 77 and 78 in parallel, the conductor 79, the train wire 42, the jumper 49, the train wire 42b, the conductors 79b and 78b, the contact finger 33b, the conducting segment 80b, the conductor 81b, the conducting segment 70b, the contact finger 39b, and by way of the conductor 71b to the other side of the current transformer.

With the apparatus in this condition, it will be apparent that the operator at the master control station 16 may obtain an indication of the current flowing in the motor circuit on the vehicle A simply by glancing at the meter 28. In case the operator desires to obtain an indication of the current flowing in the motor circuit in the vehicle unit B, it is only necessary for him to depress the control switch 43 located at the master control station 16.

Subsequent to the closure of the control switch 43, an energizing circuit is established for the operating winding 32 of the transfer switch 30, which circuit may be traced from the positive source of control potential 82 through the control switch 43, the conductor 83 and by way of the energizing winding 32 to the ground connection 15. Thereupon, the transfer switch 30 will be operated to its No. 3 position to disconnect the meters 28 and 29 from the current transformer 27 and to connect the meters 28 and 29 to the current transformer 27b through the train wires. This is accomplished simply by removing the short-circuit across the contact fingers 34 and 35 and by connecting the meters 28 and 29 to the contact fingers 33 and 34, the current transformer 27b being already connected to these contact fingers by means of the previously traced circuit. The connections of the meters 28 and 29 to these contact fingers may be traced from the contact finger 33 through the conducting segment 84, the conductor 85, the conducting segment 86, the contact finger 40, the conductor 69, the meters 29 and 28, the conductor 68, the contact finger 36, and by way of the lower portion of the conducting segment 76 to the contact finger 35. Thus, it will be seen that the meter 28 is now effective to give an indication at the master control station 16 of the current flowing in the motor circuit on the vehicle unit B.

The circuit connections for obtaining an indication at the master control station 16 of the current flowing in the motor circuit on the vehicle unit B will be maintained only so long as the control switch 43 is maintained in its depressed position. As soon as the control switch 43 is released, the energizing winding 32 of the transfer switch 30 will be de-energized and accordingly, the transfer switch will return to its No. 2 position to reconnect the meters 28 and 29 to the current transformer 27.

It is believed that it will now be apparent without further detailed description that the same operation may be obtained from any one of the other master control stations regardless of the direction of operation of the vehicle or of the manner in which the vehicle units A and B are connected together. For example, the units might be connected together with the master control station 17b on the vehicle unit B adjacent the master control station 16 on the vehicle unit A. Since the control circuits are symmetrical throughout, however, it will be apparent that the operation of the control system will be the same, regardless of the manner in which the vehicles are connected together.

Although I have shown my invention as applied to an alternating current system, in which current transformers are used to derive a suitable current from the motor circuits for energizing the meters, it will be apparent that my invention is equally applicable to direct current installations, in which case the meters may be energized from suitable current shunts.

In alternating current systems it is imperative that the circuit of the current transformers shall not be open at any time, and accordingly the transfer switches 30 and 30b are arranged to maintain the current transformers short-circuited while the connections are being changed. As previously described, when the meters 28 and 29 are connected to the current transformer 27, the current transformer 27b is short-circuited through the conducting segment 76 on the transfer switch 30 and it will be seen that when the transfer switch 30 is operated to its No. 3 position, the contact fingers 34 and 35 are maintained short-circuited by the segment 76 until after the contact fingers 33 and 35 are respectively connected through the contact fingers 40 and 36 to the meters 28 and 29. Likewise, it will be seen that when the transfer switch 30b is operated from its No. 2 to its No. 1 position, the conducting segment 70b impresses a short-circuit across the contact fingers 38b and 39b until after the contact fingers 37b and 39b are respectively connected through the contact fingers 35b and 33b to the short-circuited train wires.

The control system shown in Fig. 1 is applicable only to multiple unit vehicles that may be operated singly or in groups of two in multiple and in Fig. 2 I have shown a modified form of control circuit embodying my invention which is applicable to multiple unit vehicles that may be operated in groups of 1, 2, or 3 in multiple, as the occasion demands.

Referring to Fig. 2, the multiple unit vehicle there shown comprises three separate vehicle units C, D, and E, respectively, which are identical throughout in the construction and arrangement of the control apparatus. As was done in connection with Fig. 1, the unit C will first be described in detail and in the subsequent description of the operation, similar reference numerals followed by the letter d will be used to refer to similar parts of the vehicle unit D, and similar reference numerals followed by the letter e will be used to refer to similar parts of the vehicle unit E.

As shown, the vehicle unit C is provided with a pair of master control stations 87 and 88, respectively, having acceleration and reversing controllers 89 and 90, respectively. The acceleration and reversing controllers 89 and 90 are arranged as described in connection with Fig. 1, the acceleration controllers 89 being arranged to control the operation of suitable acceleration control means indicated diagrammatically by a control box 92, and the reversing controllers 90 being arranged to control a reversing switch 93 provided for controlling the connections of the armature 94 and field winding 95 of a suitable traction motor. As shown, the reversing switch 93 is provided with a pair of operating windings 96 and 97 arranged to be selectively energized through a pair of train wires 98 and 99.

The vehicle unit C is also provided with a transfer switch 100 which is provided with a pair of operating windings 101 and 102 and which is identical in its construction with the transfer switch 30, described in connection with Fig. 1, except for the inclusion of an auxiliary pair of contacts 103 and an auxiliary conducting segment 104. As described in connection with the transfer switch 30 in Fig. 1, the transfer switch 100 is normally biased to its No. 2 position, shown, in which position it is effective to connect a pair of meters 105 and 106 to a current transformer 107 associated with the motor circuit. Upon operation of the transfer switch 100 to its No. 1 position, the current transformer 107 is connected to a pair of train wires 108 and 109, and upon operation of the transfer switch to its No. 3 position, the meters 105 and 106 are connected to the train wires 108 and 109. It will, of course, be understood that the meter 105 is located adjacent the master control station 87 and the meter 106 is located adjacent the master control station 88.

In addition to the above described apparatus, which is similar to the arrangement described in connection with Fig. 1, the vehicle unit C is provided with a pair of three-positioned control switches 110 and 111, respectively, which are shown somewhat diagrammatically as drum type controllers, the control switch 110 being provided with a plurality of contact fingers 112 to 121, inclusive, and a plurality of conducting segments 122 to 128, inclusive, and the control switch 111 being provided with similar contact fingers and conducting segments 129 to 145, inclusive.

Adjacent the control switches 110 and 111, I provide a pair of auxiliary relays 146 and 147, respectively, which co-operate with the control switches to vary the connections of a pair of train wires 148 and 149. These train wires 148 and 149 are provided with an interlock 150 which connects the train wires together on the leading end of the unit and with jumpers 151 and 152 which connect the train wires 148 and 149, respectively, to similar train wires 148d and 149d of the vehicle unit D, similar jumpers 153 and 154 being provided to connect the train wires 148d and 149d to the train wires 148e and 149e on the vehicle unit E. Likewise, the train wires 148e and 149e are connected together on the trailing end of the vehicle unit E by an interlock 155, similar to the above mentioned interlock 150.

It will now be assumed that it is desired to operate the vehicle in a left-hand direction, as viewed in the drawings, from the master control station 87 and that the reversing drum 90 has been moved to a position corresponding to operation in a forward direction. Upon operation of the reversing drum 90 to this position, energizing circuits will be established through the contacts 156 and 157 on the reversing drum for operating the reversing switches 93, 93d, and 93e, respectively, to the forward position shown in the drawings. Since these energizing circuits are similar to the circuits traced in connection with Fig. 1, it is not believed that it is necessary to trace them in detail in connection with the present description.

It will be remembered that when the transfer switch 100 occupies its middle, or No. 2, position, the meter 105 associated with the master control station 87 will be connected in circuit with the current transformer 107 and accordingly the operator may obtain an indication of the current flowing through the motor circuit on the vehicle unit C simply by glancing at the meter. Likewise, the operator may selectively obtain an indication of the current flowing in the motor circuits on the vehicle units D or E simply by moving the control switch 110, which is associated with the master control station 87, from the No. 1 position to the No. 2 position, or to the No. 3 position, respectively.

It will now be assumed that an indication of the motor current on the vehicle D is desired and that the operator has operated control switch 110 to its No. 2 position. Subsequent to the operation of the control switch 110 to its No. 2 position, an energizing circuit is established for the transfer switch 100 which may be traced from the positive source of control potential 158 through the contacts 159 of the reversing drum 90, the conductor 160, the contacts 112 and 113 of the control switch 110, bridged by the conducting segment 122, the conductors 161 and 162, and by way of the operating winding 102 to the ground connection 163. Accordingly, the transfer switch 100 will be operated to its No. 3 position to connect the meter 105 to the train wires 108 and 109 and the subsequent engagement of the auxiliary contacts 103 by the auxiliary segment 104 of the transfer switch will complete an energizing circuit for the auxiliary relay 146d on the vehicle unit D.

This last mentioned energizing circuit extends from the conductor 162 through the conductor 164, the contacts 103, the conductor 165, the contact fingers 118 and 117 on the control switch 110, bridged by the conducting segment 125, the conductor 166, the contact finger 134 and the conducting segment 142 on the control switch 111, the conductor 167, the conducting segment 145 and the contact finger 138, the train line 148, the jumper 151, the train wire 148d, the conducting segment 128d, the contact finger 121d, the conductor 168d, the conducting segment 124d, the contact finger 116d, the conductors 169d and 170d, and by way of the operating winding of the relay 146d to the ground connection 163d.

Subsequent to the closure of the auxiliary relay 146d, an energizing circuit is established for the transfer switch 100d, which energizing circuit may be traced from the conductor 170d through the conductor 171d, the contacts of the relay 146d, the conductors 172d and 173d, the contact fingers 132d and 131d bridged by the conducting segment 140d, the conductor 174d, the contact fingers 115d and 114d bridged by the conducting segment 123d and by way of the conductor 175d and the operating winding 101d to the ground connection 163d. Accordingly, the transfer switch 100d is operated to its No. 1 position to connect the current transformer 107d to the train wires 108d and 109d, whereupon an indication of the current flowing through the motor circuit on the vehicle unit D may be obtained from the meter 105 at the master control station 87.

An indication of the current flowing in the motor circuit on the vehicle unit E may likewise be obtained at the master control station 87 by simply operating the control switch 110 to its No. 3 position. Upon operation of the control switch 110 to this position, it will be seen that the energizing circuits for the auxiliary relay 146d and the transfer switch 100d will be interrupted at the contact fingers 117 and 118 of control switch 110. Simultaneously, however, an energizing circuit will be completed for the auxiliary relay 147e on the vehicle unit E. It will be observed that the energizing circuit for the transfer switch 100 is maintained through the conducting segment 122 of the control switch 110 and the energizing circuit for the auxiliary relay 147e may be traced from the contacts 103 of the transfer switch 100 through the conductor 165, the contact fingers 118 and 119, bridged by the conducting segment 126, the conductor 176, the contact fingers 136 and 137, bridged by the conducting segment 144, the train wire 149, the jumper 152, the train wire 149d, the contact fingers 119d and 120d bridged by the conducting segment 127d, the conductor 176d, the contact fingers 136d and 137d, bridged by the conducting segment 144d, the train wire 149d, the jumper 154, the train wire 149e, the contact fingers 119e and 120e, bridged by the conducting segment 127e, the conductor 176e, the contact fingers 136e and 137e, bridged by the conducting segment 144e, the train wire 149e, the interlock 155, the train wire 148e, the contact finger 138e, the conducting segment 145e, the conductor 167e, the contact finger 134e, the conducting segment 142e, the conductors 166e and 177e, and by way of the operating winding of the auxiliary relay 147e to the ground connection 163e.

Subsequent to the closure of the auxiliary relay 147e an energizing circuit is completed for the transfer switch 100e which may be traced from the conductor 177e by way of the conductor 178e, the contacts of the relay 147e, conductors 172e and 173e, the contact fingers 132e and 131e, bridged by the conducting segment 140e, the conductor 174e, the contact fingers 115e and 114e, bridged by the conducting segment 123e and by way of the conductor 175e and the operating winding 101e to the ground connection 163e. Upon energization of the operating winding 101e, the transfer switch 100e will be operated to its No. 1 position to connect the current transformer 107e to the train wires 108e and 109e whereupon an indication of the current flowing in the motor circuit of the vehicle unit E may be obtained by means of the meter 105 at the master control station 87.

Similarly, there may be obtained at master control station 88e on the vehicle unit E an indication of the current flowing in the motor circuits of the vehicles D and C by selectively operating the control switch 111e to its No. 2 or its No. 3 position. Since the circuits involved are substantially identical with the circuits traced above, it is not believed necessary to trace these latter circuits in detail.

It will thus be seen that I have provided an extremely flexible metering system by means of which an indication may be obtained in the leading vehicle unit of the current flowing in the motor circuits on any one of the trailing vehicles.

It will likewise be apparent that an indication may be obtained at the master control station 88d of the current flowing in the motor circuit of the vehicle unit C. An indication of the motor current flowing in the vehicle unit E cannot be obtained at the master control station 88d, however, since operation of the control switch 111d to its second or third position interrupts at the contact fingers 137d and 138d the circuit to the train wires 148d and 149d leading to the vehicle unit E. For similar reasons, an indication may be obtained at the master control station 87d of the current flowing only in the motor circuits of the vehicles D and E.

While I have shown particular embodiments of my invention, it will be understood, of course, that I do not wish to be limited thereto, since many modifications may be made and I, therefore, contemplate by the appended claims to cover any such modifications as fall within the spirit and scope of my invention.

What I claim as new and desire to secure by Letters Patent of the United States is:

1. In a control system for an electric vehicle having a plurality of motor circuits and a plurality of controllers for said motor circuits, the combination of metering means associated with each of said controllers, and means associated with each controller and including said controller for selectively connecting the associated metering means to any one of said motor circuits.

2. In a control system for an electric vehicle having a plurality of motor circuits and a plurality of controllers for said motor circuits, the combination of a meter for each controller, and means associated with each controller and including said controller for selectively connecting the associated meter to any one of said motor circuits.

3. In a control system for an electric vehicle having a plurality of separate motor circuits, and a plurality of master control stations for said motor circuits, the combination of metering means associated with each of said control stations, means associated with each of said motor circuits for deriving therefrom a current proportional to the motor current, and means for selectively connecting any one of said metering means in circuit with any one of said current deriving means.

4. In a control system for a multiple unit vehicle having a separate traction motor circuit associated with at least two of the vehicle units and a plurality of master control stations for said motor circuits, the combination of a plurality of meters, each of said control stations having at least one of said meters associated therewith, a current transformer for each motor circuit, and means for selectively connecting any one of said meters in circuit with any one of said current transformers.

5. In a control system for a multiple unit vehicle having separate motor circuits for at least two of the vehicle units and a master controller station on each of said units for controlling said motor circuits, the combination of metering means on each of said units adjacent said master control stations, and means including the master controller station on the leading one of said units for selectively connecting the metering means on said leading unit to any one of said motor circuits.

6. In a control system for a multiple unit vehicle having separate motor circuits for at least two of the vehicle units and master control stations on each unit for controlling said motor circuits, the combination of a meter for each of said master control stations, a current transformer for each of said motor circuits, and means including one of said master control stations on the leading one of said units for selectively connecting the meter associated with said one station to any one of said current transformers.

7. In a control system for a multiple unit vehicle having separate motor circuits associated with at least two of the vehicle units and master controllers on each of said units for controlling said motor circuits, the combination of a meter for each of said controllers, current deriving means on each of said units respectively associated with said motor circuits, a pair of train wires extending between said units, switch means on each of said units normally connecting the respective meters in circuit with the associated current deriving means, and means including one of said master controllers for operating said switch means to connect to said train wire the meters on one of said units and the current deriving means on another of said units.

8. In a control system for a multiple unit vehicle having separate motor circuits associated with at least two of the vehicle units and master controllers on each of said units for controlling said motor circuits, the combination of a meter for each of said controllers, a current transformer associated with the motor circuit on each of said units, a pair of train wires extending between said units, switch means normally connecting the meters on each of said units in circuit with the associated current transformer, means responsive to operation of any one of said master controllers on any one of said units for operating the switch means on another of said units to connect the current transformer on said other unit to said train wires, and means for operating said switch means on said one unit to connect the meters on said one unit to said train wires.

9. In a control system for a multiple unit vehicle having separate motor circuits associated with at least two of the vehicle units and master controllers on each of said units for said motor circuits, the combination of a meter for each of said controllers, current transformers on each of said units associated with said motor circuits, a pair of train wires extending between said units, transfer switch means on each of said units normally connecting the meters on that unit to the current transformer on that unit, means responsive to the operation of one of said master controllers on one of said units for operating the transfer switch means on another of said units to connect the current transformer on said other unit to said train wire, and control means adjacent said master controller operable at will to actuate the transfer switch means on said one unit to connect the meter on said one unit to said train wire.

10. In a control system for a multiple unit vehicle having separate motor circuits associated with three of the vehicle units and master controllers on each of said units for controlling said motor circuits, the combination of a meter associated with each of said master controllers, a pair of train wires extending between said three units, transfer switch means for each unit normally connecting the meters on that unit to the associated motor circuit, auxiliary control means associated with each of said master controllers, means responsive to operation of a master controller on one end of one of said units and to operation of the associated auxiliary control means to one position for operating the respective transfer switch means on said one end unit and on the middle one of said units to connect said train wires to the motor circuits on said middle unit and to the meters on said one end circuit respectively, and means responsive to operation of said one auxiliary control means to another position for operating the transfer switch means on said middle and the other end one of said units to disconnect said train wires from said motor circuit on said middle unit and to connect said train wire to the motor circuits on said other end unit.

HAROLD S. OGDEN.